United States Patent [19]
Belser et al.

[11] Patent Number: 5,974,019
[45] Date of Patent: Oct. 26, 1999

[54] OPTICAL SYSTEM FOR TWO-DIMENSIONAL POSITIONING OF LIGHT BEAMS

[75] Inventors: Karl A. Belser, San Jose; Joseph Drake; John H. Jerman, both of Palo Alto; Alan A. Fennema, Sunnyvale, all of Calif.

[73] Assignee: Seagate Technology, Inc., Scotts Valley, Calif.

[21] Appl. No.: 09/061,839

[22] Filed: Apr. 16, 1998

Related U.S. Application Data

[60] Provisional application No. 60/045,593, May 5, 1997.

[51] Int. Cl.$^6$ ........................................................ G11B 7/00
[52] U.S. Cl. .................. 369/109; 369/44.14; 369/44.37; 369/103; 369/112
[58] Field of Search ..................................... 369/112, 109, 369/103, 125, 44.37, 44.14, 44.23; 356/357, 359, 360, 349; 385/33, 16, 22, 18

[56] References Cited

U.S. PATENT DOCUMENTS

| | | | |
|---|---|---|---|
| 4,239,330 | 12/1980 | Ashkin et al. | 385/22 |
| 4,265,513 | 5/1981 | Matsushita et al. | 385/22 |
| 4,304,460 | 12/1981 | Tanaka et al. | 385/22 |
| 4,498,730 | 2/1985 | Tanaka et al. | 385/18 |
| 4,626,066 | 12/1986 | Levinson | 385/22 |
| 4,896,937 | 1/1990 | Kraetsch et al. | 385/16 |
| 4,978,190 | 12/1990 | Veith | 385/33 |
| 5,000,532 | 3/1991 | Kraetsch et al. | 385/16 |
| 5,024,500 | 6/1991 | Stanley et al. | 385/16 |
| 5,159,408 | 10/1992 | Waldenmaier et al. | 356/357 |
| 5,208,880 | 5/1993 | Riza et al. | 385/18 |
| 5,260,928 | 11/1993 | Lee et al. | 369/112 |
| 5,272,690 | 12/1993 | Bargerhuff et al. | 369/112 |
| 5,319,629 | 6/1994 | Henshaw et al. | 369/103 |
| 5,446,811 | 8/1995 | Field et al. | 385/23 |
| 5,452,283 | 9/1995 | Lee et al. | 369/112 |
| 5,493,440 | 2/1996 | Souda et al. | 359/341 |
| 5,532,884 | 7/1996 | Lee et al. | 359/833 |
| 5,647,033 | 7/1997 | Laughlin | 385/16 |
| 5,677,903 | 10/1997 | Holtslag et al. | 369/112 |

FOREIGN PATENT DOCUMENTS 6310402 11/1994 Japan.

OTHER PUBLICATIONS

"Micromachined 1X2 Optical Fiber Switch", L. Field, D. Burriesci, P. Robrish, R. Ruby, *Transducers'95*, Jun. 25–29, 1995, pp. 344–347.

Primary Examiner—John W. Cabeca
Assistant Examiner—Kim-Kwok Chu
Attorney, Agent, or Firm—Fenwick & West LLP; Mark A. Wardas

[57] ABSTRACT

A positioning system for selectively directing a first beam of light towards a destination and a second beam of light towards a first diffractive optic. The first beam of light and the second beam of light traverse a substantially co-linear optical path. The first diffractive optic diffracts the second beam of light into a plurality of optical spots. The second beam of light comprising the plurality of optical spots is directed onto a second diffractive optic. A change in position of the plurality of optical spots relative to the second diffractive optic is sensed in a reflection of the second beam of light by a detection element and representative signals are derived thereof. The signals are coupled to a directing assembly, which directs the first beam of light towards the destination.

18 Claims, 19 Drawing Sheets

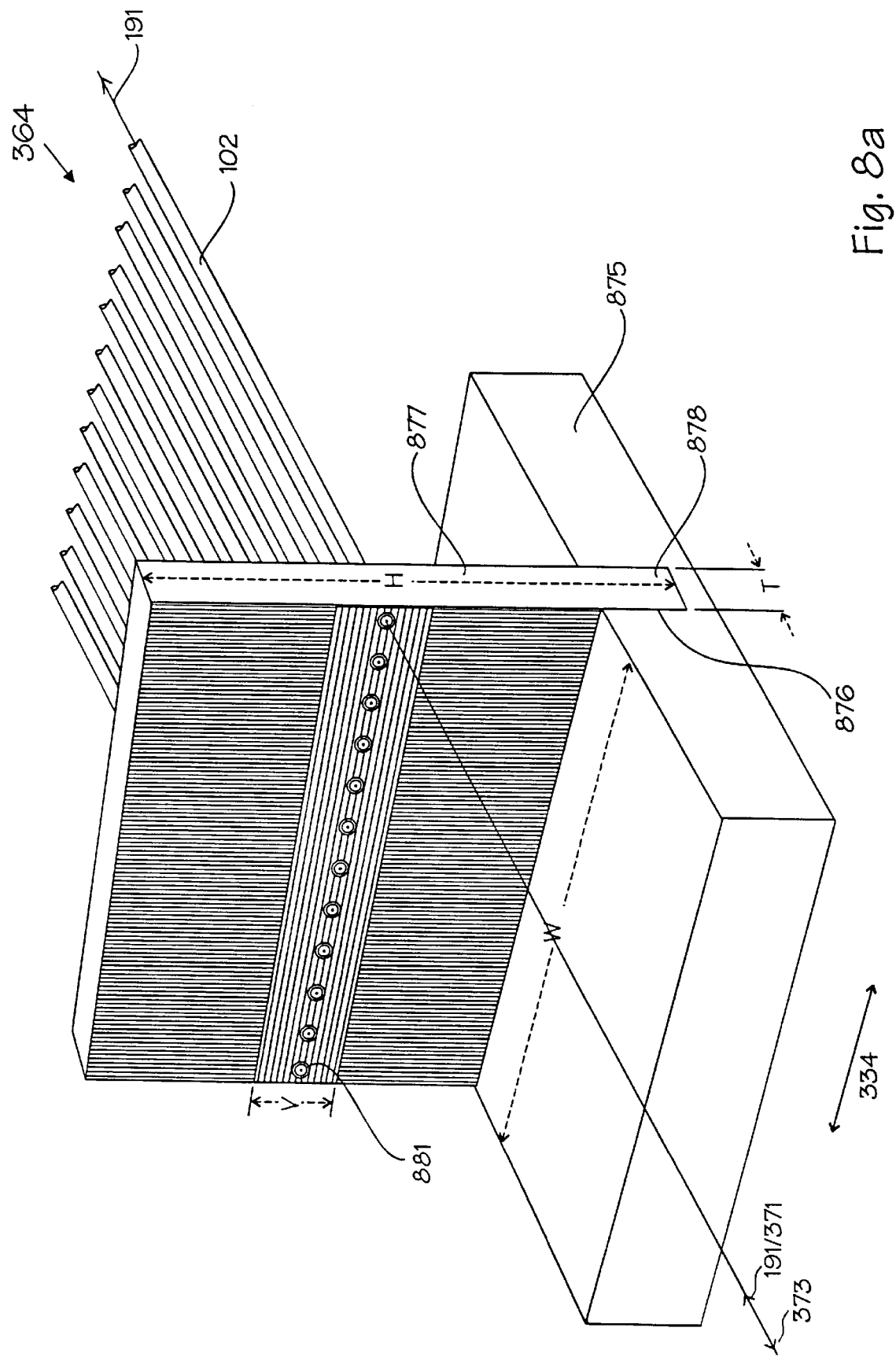

|   | Process | Steps | Mask |
|---|---|---|---|
| 1 | Wafer Prep | Obtain Wafers:<br>[(100), low resistivity,<br>Single polished]<br>Scribe Wafer ID Nonmetal clean |  |
| 2 | Thick Oxide Growth | Pre-Diffusion Clean<br>Thick Thermal Oxidation<br>Thickness:_____ |  |
| 3 | Thick LPCVD Nitride | Pre-Diffusion Clean<br>Low-Stress Silicon Nitride Deposition<br>Thickness: _____ |  |
| 4 | Thin Oxide Deposition | Pre-Diffusion Clean<br>LTO Undoped Oxide Deposition |  |
| 5 | Define Grating | Vapor Prime,<br>Photoresist, Spin Coat,<br>Soft Bake, Align and Expose,<br>Develop, Inspect,<br>Hard Bake, BOE,<br>Inspect, Resist Strip,<br>Measure Grating with Alphastep,<br>Land Width:_____,<br>Step Height:_____ | Lev. 1. Grating Bar Alignment Marks |
| 6 | Thin LPCVD Nitride | Pre-Diffusion Clean (No HF dip)<br>LPCVD Low-Stress Silicon Nitride<br>Measure Grating with Alphastep<br>Land Width:_____<br>Step Height:_____ |  |
| 7 | Define Laser Hole | Vapor Prime,<br>Photoresist Spin Coat Backside,<br>Hard Bake,<br>Photoresist Spin Coat Frontside<br>Soft Bake (in oven),<br>Align and Expose, Develop, Inspect,<br>Hard Bake (in oven),<br>Plasma Etch (Through Nitride/Oxide,<br>layers into Silicon),<br>Verify Silicon surface with Nanospec,<br>Resist Strip, Inspect,<br>Measure Step Height with Alphstep,<br>Total Film Height:_____ | Lev. 2. 13um Laser Access Hole / Alignment Marks |
| 8 | Polish | CMP or polish to 100 um thickness<br>Inspect<br>Post-polish clean |  |

Fig. 16A

| | Process | Steps | Mask |
|---|---|---|---|
| 9 | Oxidation | Pre-Diffusion Clean<br>Oxidation<br>Thickness:_____ | |
| 10 | Define Fiber Holes | Vapor Prime<br>Photoresist Spin Coat Frontside<br>Hard Bake<br>Photoresist Spin Coat Backside<br>Soft bake (in oven)<br>Align and Expose<br>Develop<br>Inspect Hard Bake (in oven)<br>BOE<br>Verify Silicon surface with Nanospec<br>Deep Reactive Ion Etch<br>Inspect<br>Measure Hole Width<br>Resist Strip<br>BOE | |
| 11 | Separation | Dice into individual chips<br>Separate<br>Clean | Lev. 4. Backside Fiber Holes/ Alignment Marks |
| 12 | Edge Rounding | Short HNA isotropic etch | |
| 13 | Metalize Grating | Evaporate Au | |

Fig. 16B

OPTICAL SYSTEM FOR TWO-DIMENSIONAL POSITIONING OF LIGHT BEAMS

CROSS REFERENCE TO RELATED APPLICATIONS

This application is related to and claims priority from U.S. Provisional Application No. 60/045,593, entitled "Two Dimensional Optical Positioning System," filed on May 5, 1997. The subject matter of this application is also related to U.S. patent application Ser. No. 08/851,379, entitled "Data Storage System Having An Optical Processing Flying Head," filed on May 5, 1997.

The subject matter of each of these related applications is incorporated herein by reference. All related applications are commonly assigned.

BACKGROUND OF THE INVENTION

1. Field of the Invention

The present invention relates generally to optical positioning of a light beam and more particularly to two-dimensional optical positioning of a light beam.

2. Background Art

A number of optical switch technologies are currently used to control the optical passage of light. With one technology, electric current is applied to a polymer to create a thermal effect that changes a refractive index of a polymer. As the refractive index changes, a light beam passing through the polymer is selectively routed from an input to an output. Although faster than a comparable mechanical optical switch, the switching time of polymer optical switches is limited significantly by the thermal characteristics of the polymer. Additionally, the optical properties of the light transmitted through the polymer are undesirably affected by the optical characteristics of the polymer.

Another optical switch is disclosed by Leslie A. Field et al. in "The 8$^{th}$ International Conference on Solid-State Sensors and Actuators, and Eurosensors IX, Stockholm, Sweden, Jun. 25–29, 1995." The optical switch is micromachined in silicon and uses a thermally activated actuator to mechanically move a single send optical fiber relative to two receive optical fibers. Field et al. exhibits relatively slow mechanical movement due to inherent thermal effects. Additionally, Field et al. provides only one degree of optical alignment, resulting in inefficient transfer between optical fibers due to slight misalignments.

Another micromachined optical switch is disclosed by Levinson in U.S. Pat. No. 4,626,066. Levinson uses a cantilevered micromachined mirror that is electrostatically positioned between a stopped and unstopped position. While Levinson's mirror may deflect light between two optical fibers, as with the aforementioned switch designs, it also is capable of optical alignment in only one dimension.

Reflections of a diffracted impinging laser beam from a grooved surface may be used to maintain a one-dimensional position of the impinging diffracted laser beam relative to the grooved surface, for example, a position of an impinging laser beam on a grooved surface of a compact disk (CD) drive.

What is needed is an optical switch that provides fast and precise switching of light between one input and a plurality of outputs, or vice versa.

SUMMARY OF THE INVENTION

The present invention selectively directs a first beam of light towards a destination. In the present invention, a second beam of light is directed towards a first diffractive optic. The first diffractive optic diffracts the second beam of light into a plurality of optical spots. The second beam of light comprising the plurality of optical spots is directed onto a second diffractive optic. In the present invention the first beam of light and the second beam of light traverse a substantially co-linear optical path. A change in position of the plurality of optical spots relative to the second diffractive optic is sensed in a reflection of the second beam of light by a detection element and representative signals are derived thereof. In the present invention, the signals are coupled to a directing assembly, which directs the first beam of light towards the destination. The destination may be an output port comprising the second diffractive optic. The output port may comprise part of an optical switch. The optical switch may be included in a disk drive and the output port may be coupled to an optical fiber to direct the first beam of light towards a storage disk of the disk drive. In the present invention the first diffractive optic comprises a holographic diffraction element, and the second diffractive optic comprises a plurality of first grooves and second grooves. In the present invention, the first grooves and the second grooves are disposed orthogonal to each other.

BRIEF DESCRIPTION OF THE DRAWINGS

FIG. 8a is a diagram illustrating an optical fiber coupling assembly in a perspective view;

FIG. 16 illustrates series of process steps for manufacturing the second diffractive optic.

DETAILED DESCRIPTION OF THE PREFERRED EMBODIMENTS

Figure 1:
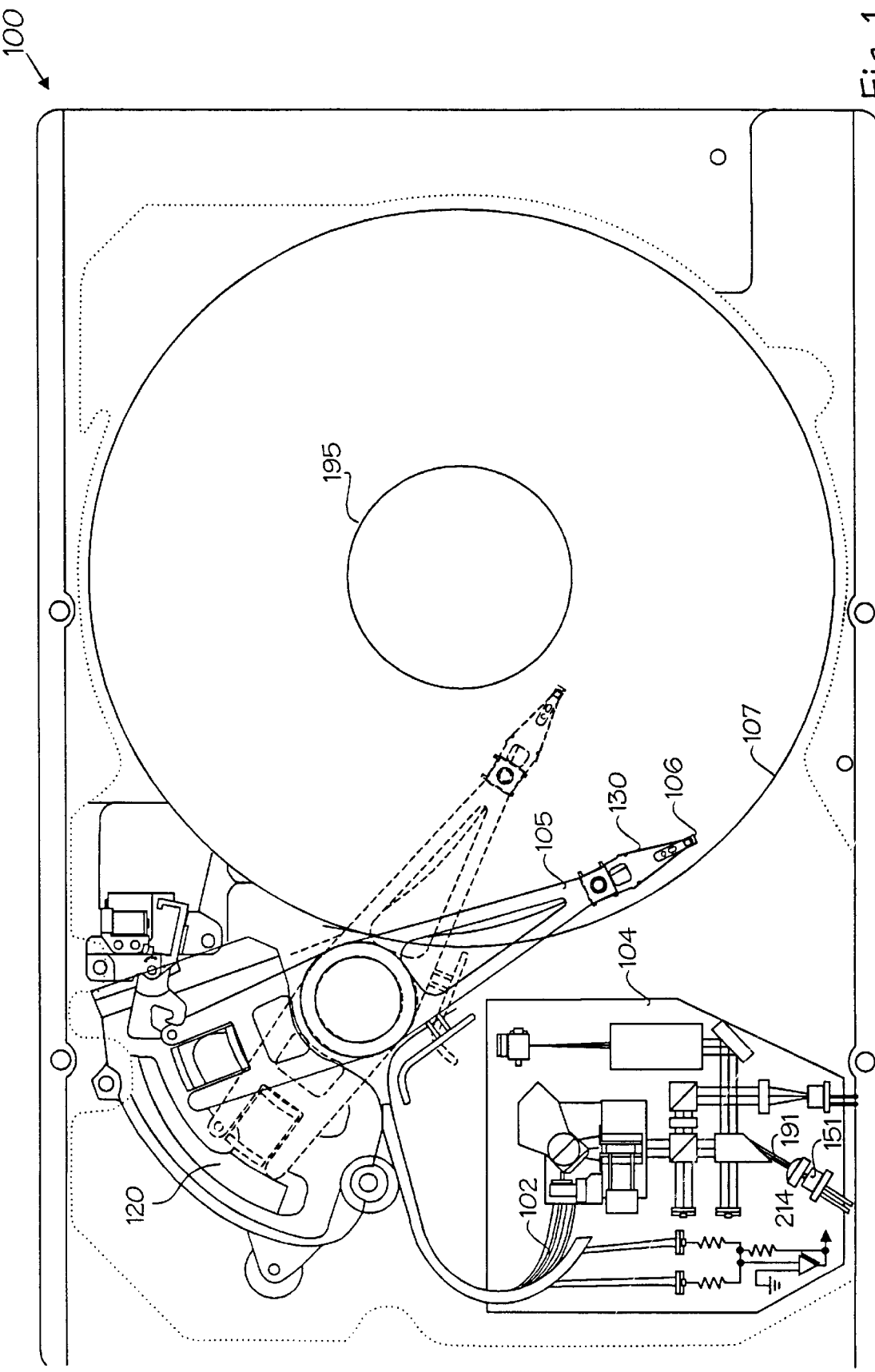
FIG. 1 is a diagram showing a magneto-optical data storage and retrieval system.

Referring in detail to the drawings wherein similar parts of the invention are identified by like reference numerals, there is seen in FIG. 1 a diagram showing a magneto-optical data storage and retrieval system. The magneto-optical (MO) data storage and retrieval system 100 includes a set of Winchester-type flying heads 106 that are adapted for use with a set of six double-sided MO disks 107 (only one disk and one head shown). The set of flying heads 106 (hereinafter referred to as flying MO heads) are coupled to a rotary actuator magnet and coil assembly 120 by a respective suspension 130 and actuator arm 105 so as to be positioned over the surfaces of the set of MO disks 107. In operation, the set of MO disks 107 are rotated by a spindle motor 195 so as to generate aerodynamic lift forces between the set of flying MO heads 106 and so as to maintain the set of flying MO heads 106 in a flying condition approximately 15 micro-inches above the upper and lower surfaces of the set of MO disks 107. The lift forces are opposed by equal and opposite spring forces that are applied by the set of suspensions 130. During non-operation, the set of flying MO heads 106 are maintained statically in a storage condition away from the surfaces of the set of MO disks 107. System 100 further includes: a laser-optics assembly 104, and a set of optical fibers 102. In an exemplary embodiment, the optical fibers are single mode polarization maintaining optical fibers. Each of the set of optical fibers 102 are coupled through a respective one of the set of actuator arms 105 and suspensions 130 to a respective one of the set of flying MO heads 106. The laser-optics assembly 104 includes a laser diode 151 that supplies a first outgoing laser beam 191 (with reference to the laser diode 151).

Figure 2:
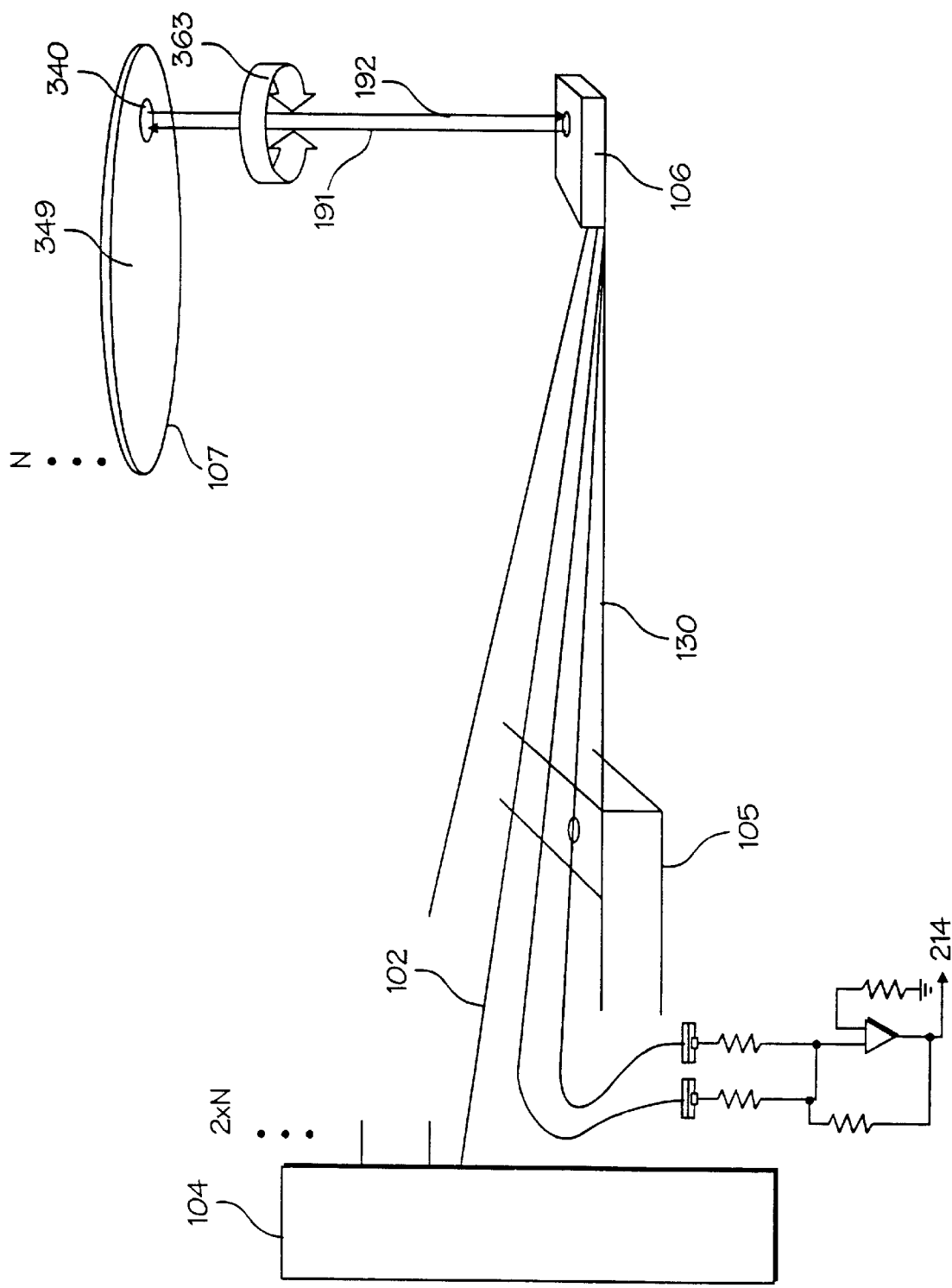
FIG. 2 is a diagram illustrating a laser-optics assembly and a typical optical path.
Figure 3:
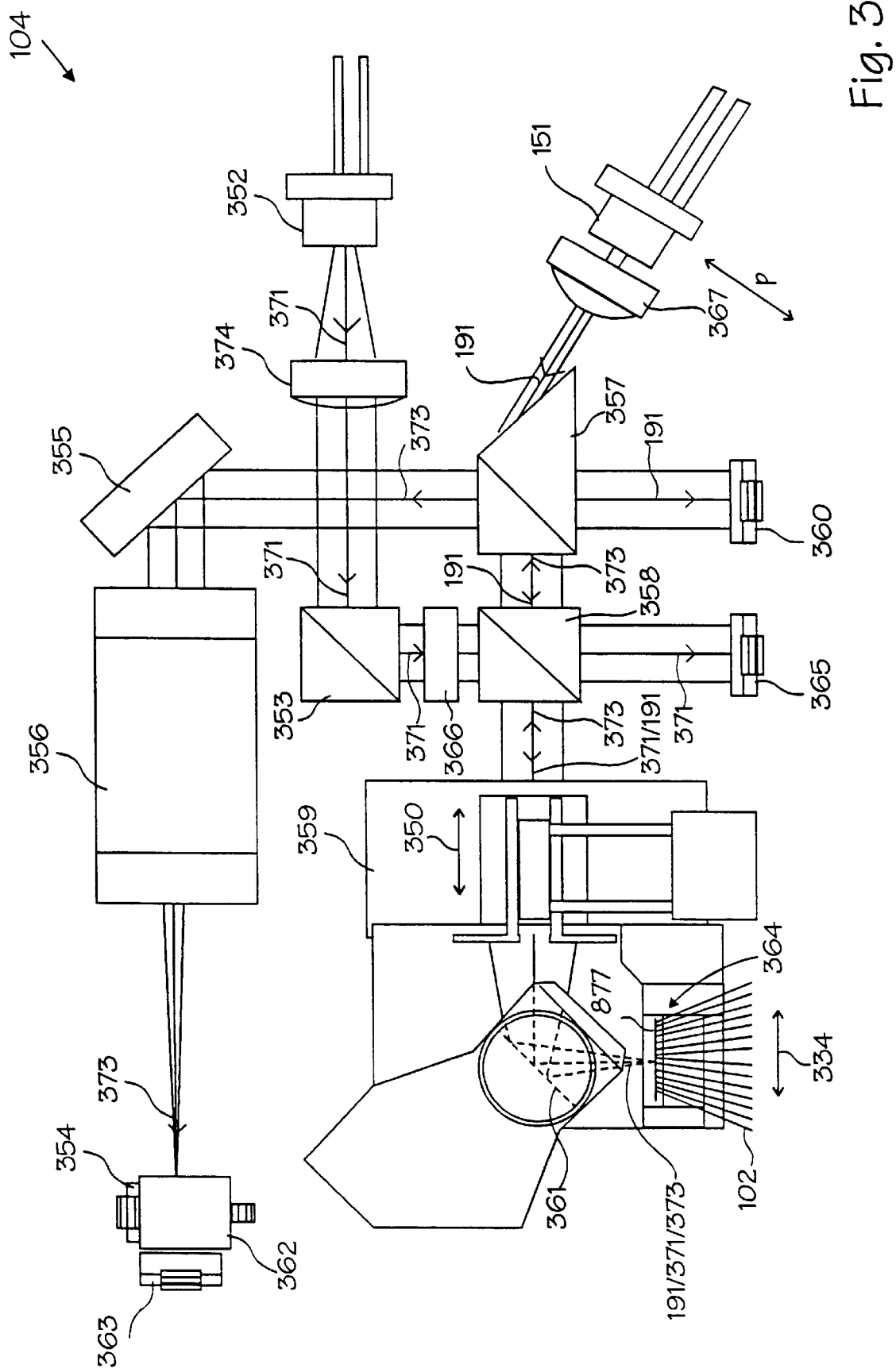
FIGS. 3–7 are diagrams illustrating a laser-optics assembly in a top view and four perspective views, respectively.

FIG. 2 is a diagram illustrating the laser-optics assembly 104 and a typical optical path. In a preferred embodiment, a first optical path is shown in FIG. 2 to include: the laser-optics assembly 104, one of the set of optical fibers 102, and one of the set of flying MO heads 106. The laser-optics assembly 104 directs the outgoing laser beam 191 towards a selected central core (i.e., an out put port of 2×N output ports, wherein N equals the number of MO disks 107) of one of the set of optical fibers 102. The outgoing laser beam 191 is conveyed by the optical fiber 102 towards the flying MO head 106 and by the flying MO head 106 towards a surface recording/storage layer 349 of a respective one of the set of MO disks 107.

During writing of information, the outgoing laser beam 191 lowers a coercivity of the recording/storage layer 349 by heating a selected spot of interest 340 to approximately the Curie point of the recording/storage layer 349. Preferably, the optical intensity of outgoing laser beam 191 is held constant, while a time varying vertical bias magnetic field is used to define a pattern of "up" or "down" magnetic domains perpendicular to the surface recording/storage layer 349. This technique is known as magnetic field modulation (MFM). Subsequently, as the selected spot of interest 340 cools, information embodied in the magnetic field waveform is encoded within the recording/storage layer 349 of the respective MO disk 107.

During track following and reading of information, the outgoing laser beam 191 is reflected from the MO disk 107 as a first reflected laser beam 192. The first reflected laser beam 192 is conveyed back to additional optical elements located on the flying MO head 106 for detection and processing. An apparatus and method for detection and processing of the reflected laser beam 192 is described in commonly assigned U.S. patent application Ser. No. 08/851, 379, entitled "Data Storage System Having An Optical Processing Flying Head," filed on May 5, 1997.

Figure 4:
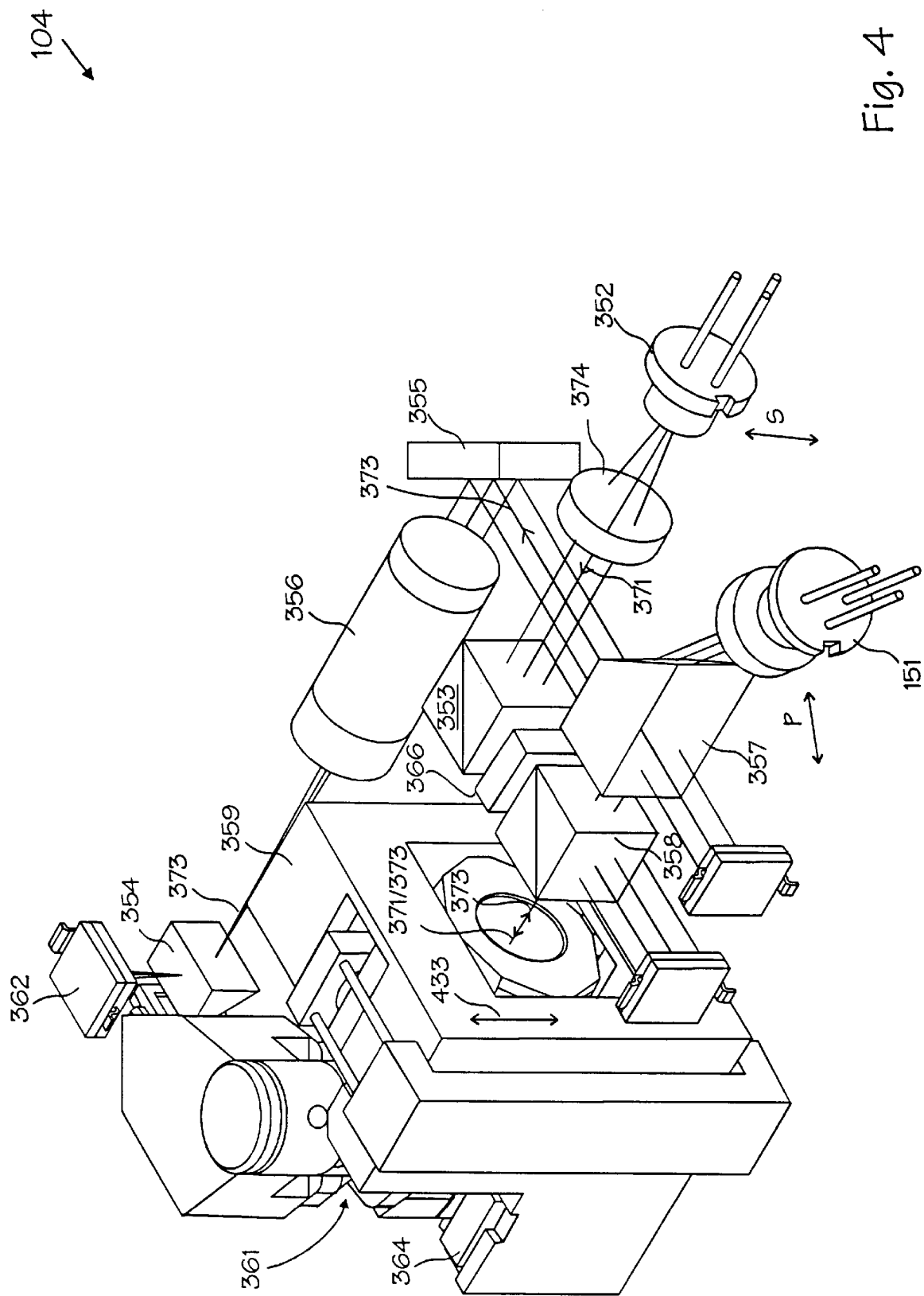
Figure 5:
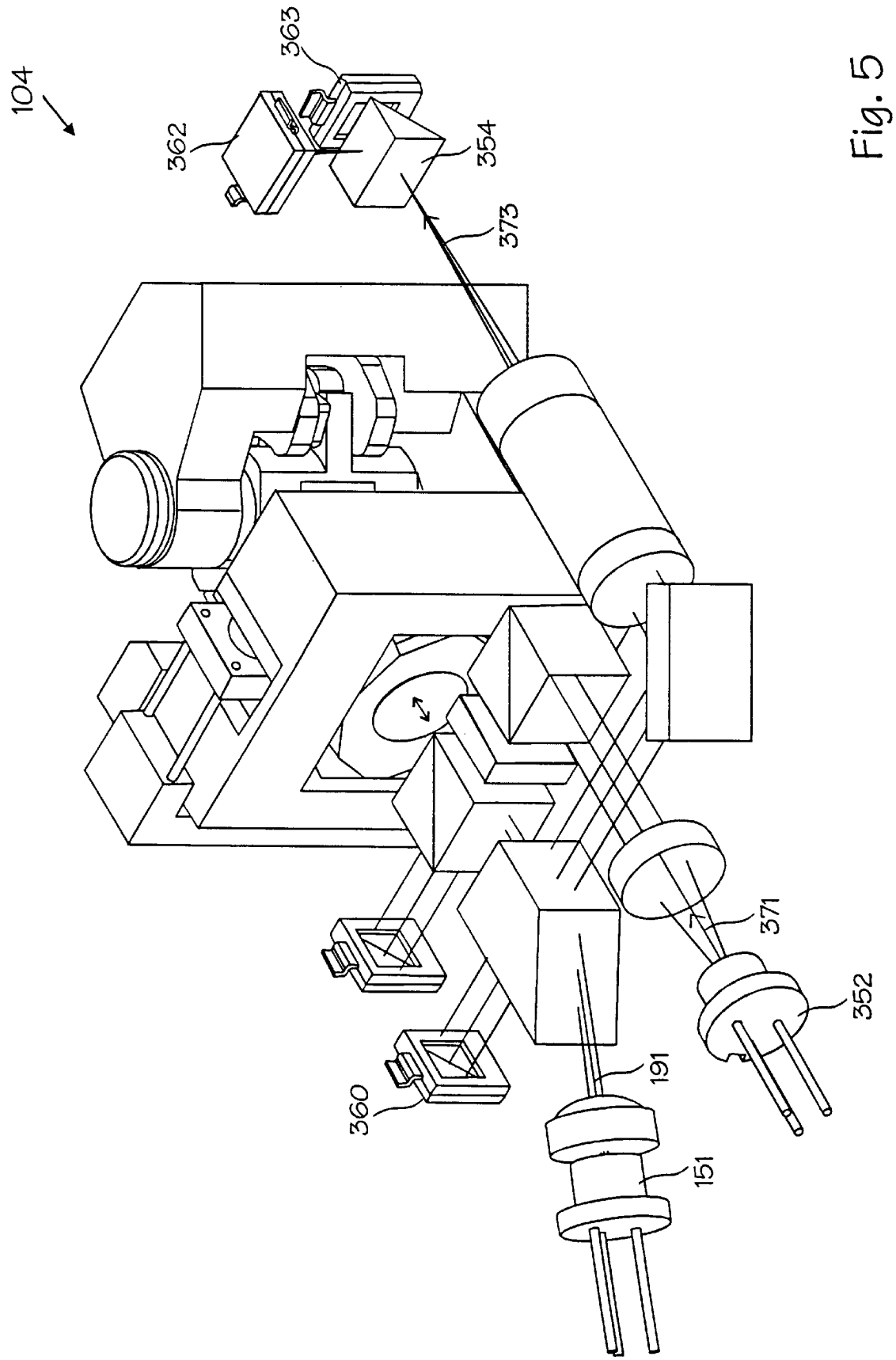
Figure 6:
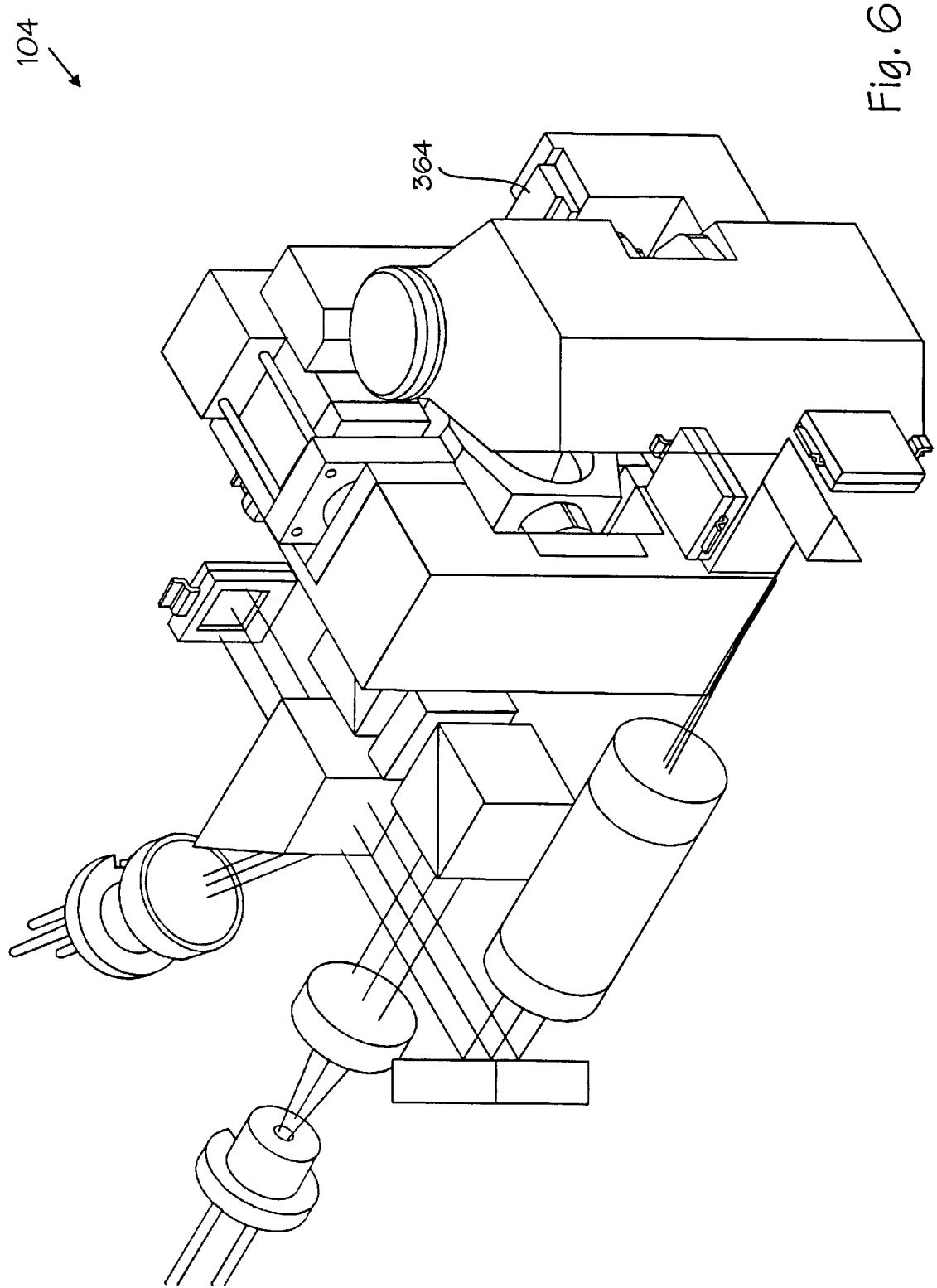
Figure 7:
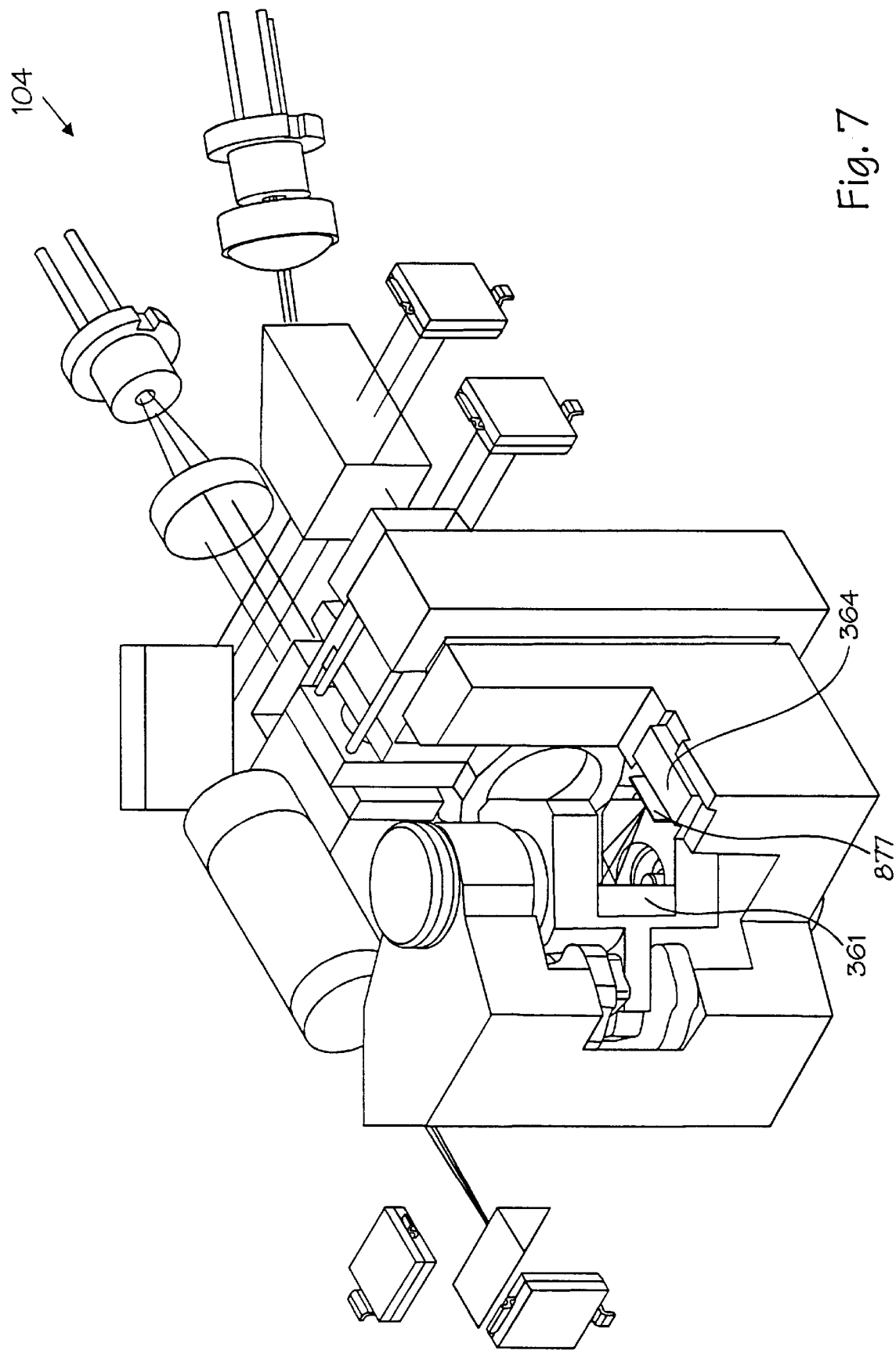

FIGS. 3–7 are diagrams illustrating the laser-optics assembly 104 in a top view and four perspective views, respectively. The laser-optics assembly 104 further includes: a first collimating optics 367, a circularizing prism/beamsplitter 357, a dichroic beam splitter 358, a two stage optical actuator assembly 359, and a mirror 361. which are all positioned in the first optical path between the laser diode 151 and an optical fiber coupling assembly 364. In an exemplary embodiment, the laser diode 151 provides the first outgoing laser beam 191 at a wavelength of 650 nm and an operating power of approximately 35 mw. It is understood that other operating powers and other wavelengths for the laser diode 151 are also within the scope of the present invention. A "P" polarization of the laser diode 151 is preferably oriented in a direction generally parallel to a horizontal plane of the laser-optics assembly 104. The laser-optics assembly 104 further includes a first sensor 360. The first sensor 360 senses a portion of the first outgoing laser beam 191 and generates a feedback signal to maintain a power of the P polarized laser diode 151 at a constant level. The first collimating optics 367, the circularizing prism/beam-splitter 357, and the dichroic beam splitter 358 are positioned in the first optical path so as to direct the first outgoing laser beam 191 towards the optical actuator assembly 359. The first outgoing laser beam 191 is directed by the optical actuator assembly 359 towards the mirror 361 and is reflected by the mirror 361 towards the optical fiber coupling assembly 364. The optical actuator assembly 359 includes a two stage actuator which is controlled by conventional voice coil motors (not shown). The optical actuator assembly 359 positions a set of internal color corrected optics (not shown) in a horizontal focus direction 350 and a vertical direction 433 (FIG. 4). The optical fiber coupling assembly 364 comprises a linear actuator (not shown) of a variety well known in the art, which positions the set of optical fibers 102 in a horizontal direction 334 in the first optical path of the first outgoing laser beam 191. As described below, the movements 334, 350, and 433 are used to selectively align the first outgoing laser beam 191 over a central core of one of the set of optical fibers 102. The set of optical fibers 102 subsequently convey the first outgoing laser beam 191 towards a particular MO disk 107.

The laser-optics assembly 104 further includes a second laser diode 352, a second collimating optics 374, a first beam splitter 353, and a first diffractive optic 366, which are all positioned in a second optical path between the laser diode 352 and the optical fiber coupling assembly 364. In an exemplary embodiment, the laser diode 352 provides a second outgoing laser beam 371 at a wavelength of 780 nm and an output power of approximately 5 mw. It is understood that other operating powers and other wavelengths for the laser diode 352 are also within the scope of the present invention. A "S" polarization of the laser diode 352 is preferably oriented in a vertical direction (see FIG. 4). The laser-optics assembly 104 further includes a second sensor 365. The second sensor 365 senses a portion of the second outgoing laser beam 371 and generates a feedback signal to maintain a power of the laser diode 352 at a constant level. In the preferred embodiment, the second collimating optics 374, the first beam splitter 353, the first diffractive optic 366, and the dichroic beam splitter 358 are positioned in the second optical path so as to direct the second outgoing laser beam 371 towards the optical actuator assembly 359. The second outgoing laser beam 371 is directed by the optical actuator assembly towards the mirror 361 and by the mirror 361 towards a surface of the optical fiber coupling assembly 364. The optical actuator assembly 359 positions the set of internal color corrected optics (not shown) in the focus direction 350 and the vertical up down direction 433 (FIG. 4), and the optical fiber coupling assembly 364 positions the set of optical fibers 102 in a horizontal direction 334 in the second optical path traversed by the second outgoing laser beam 371. The resultant movements 334, 350, and 433 optically alter the second optical path such that the second outgoing laser beam 371 is selectively directed towards the optical fiber coupling assembly 364. The second outgoing laser beam 371 is reflected from the optical fiber coupling assembly 364 and returns as a third reflected laser beam 373 along a third optical path that includes: the mirror 361, the optical actuator assembly 359, the dichroic beam splitter 358, the circularizing prism/beamsplitter 357, a reflective element 355, an optical assembly 356, and a second beam splitter 354. The third reflected laser beam 373 is subsequently directed by the second beam splitter 354 towards a vertical 362 and a horizontal 363 detector.

FIG. 8a is a diagram illustrating the optical fiber coupling assembly in a perspective view. The optical fiber coupling assembly 364 includes a second diffractive optic 877 and a body 875. The body 875 includes a channel 876 formed therein. The second diffractive optic 877 comprises a lower horizontal periphery 878. In the preferred embodiment, the channel 876 includes a width and a depth of sufficient dimension to permit coupling of the lower periphery 878 of the diffractive optic 877 thereto. In an exemplary embodiment the second diffractive optic 877 includes a vertical outer height H that is approximately 840 um, a vertical inner height V that is approximately 160 um, a width along the lower horizontal periphery W that is approximately 2910 um, and a thickness T that is approximately 100 um thick. As discussed above, the optical fiber coupling assembly 364 includes a single stage actuator (not shown) that linearly positions the optical fiber coupling assembly 364 in the direction 334.

Figure 8B:
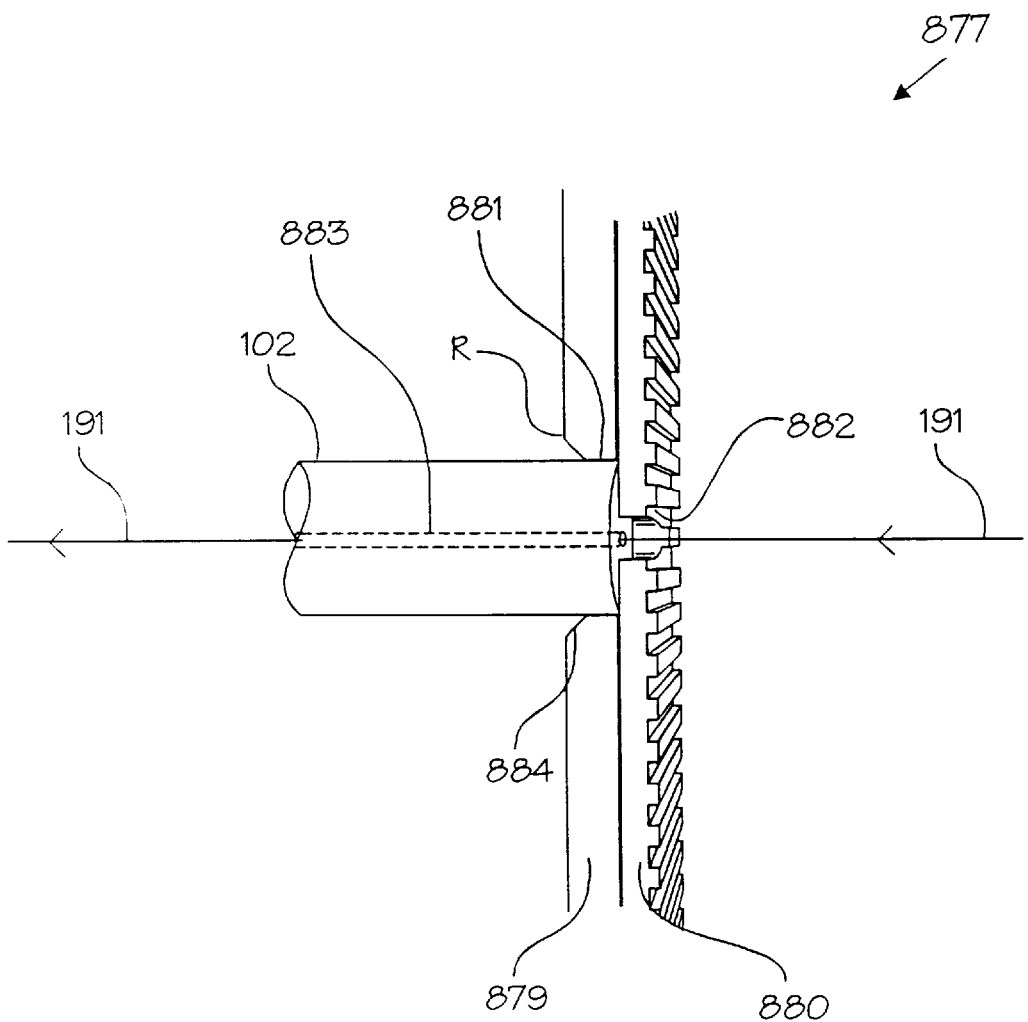
FIG. 8b is a diagram illustrating a second diffractive optic in a cross-sectional view along an optical fiber.

FIG. 8b is a diagram illustrating the second diffractive optic in a cross-section taken along an optical fiber 102. The second diffractive optic 877 further includes a grating layer 880 deposited on a silicon substrate 879. The silicon substrate 879 includes at least one circular passage 881 formed therethrough. The circular passage 881 terminates at the grating layer 880. In an exemplary embodiment, there are 12 circular passages. Each of the circular passages 881 include a diameter substantially equal to the diameter of the set of optical fibers 102. In an exemplary embodiment, each of the circular passages 881 includes a diameter of approximately 82 um and each of the set of optical fibers 102 includes a diameter of approximately 80 um. An end of each of the set of optical fibers 102 is respectively coupled to the optical fiber coupling assembly 364 within a circumference of the circular passage 881. Each of the circular passages 881 further includes a circular beveled surface 884 portion. In an exemplary embodiment, the circular beveled surface 884 includes a diameter of approximately 102 um. The beveled surface portion 884 enhances the ability to align and couple the set of optical fibers 102 to the circular passages 881. In an exemplary embodiment, the circular passages 881 are formed and aligned along a row that is generally parallel to the lower horizontal periphery 878 and are separated by a center to center spacing of approximately 199.5 um. The grating layer 880 includes a set of cylindrical holes 882, which are centrally aligned to respective central cores 883 of the set of optical fibers 102. The cylindrical holes 882 are dimensioned to permit unimpeded optical passage of the first outgoing laser beam 191. In an exemplary embodiment, each of the cylindrical holes 882 is approximately 13 um in diameter and each of the central core 883 is approximately 3 um in diameter.

Figure 9:
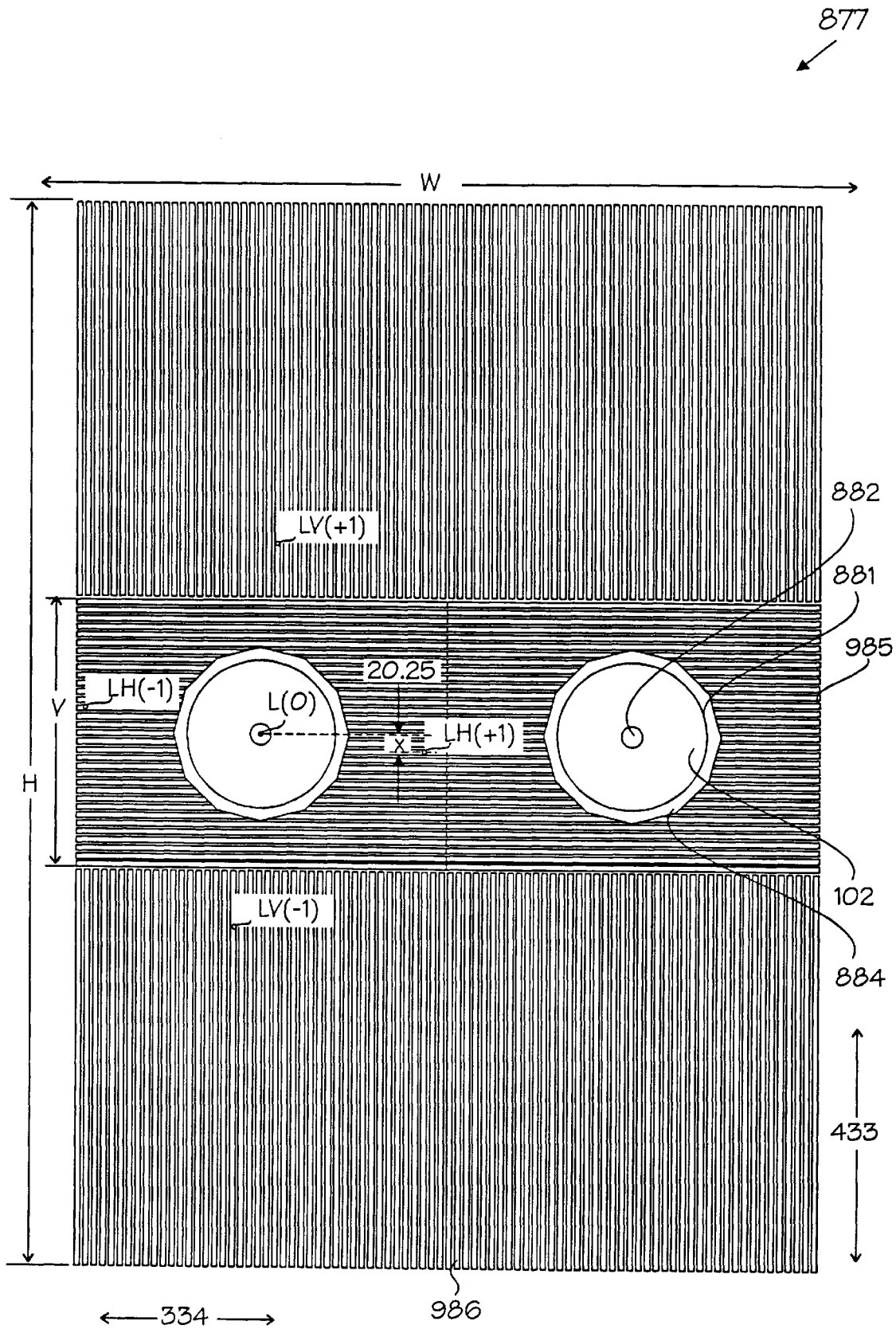
FIG. 9 is a diagram illustrating diffraction spots formed on the grating layer.

FIG. 9 is a diagram illustrating diffraction spots formed on the grating layer of the second diffractive optic. In the preferred embodiment, the grating layer 880 (FIG. 8b) comprising the second diffractive optic 877 includes a plurality of vertical grooves 986 and a plurality of horizontal grooves 985. The vertical grooves are disposed symmetrically about a horizontal axis defined by a row of the circular passages 881 (only 2 of 12 circular passages are illustrated). In the preferred embodiment, the horizontal grooves 985 extend across the horizontal width W and a vertical height V of the second diffractive optic 877, and the vertical grooves 986 extend outside the horizontal grooves 985 and within the horizontal width W and the vertical height H of the of the diffractive optic 877. In an exemplary embodiment, the vertical 986 and horizontal grooves 985 comprise: a groove depth of approximately 146 nm (approximately 3/16 times the wavelength of the 780 nm laser wavelength), a spacing between grooves of approximately 4.75 um, a land width of approximately 1.25 um, and a groove width of approximately 3.5 um.

Referring back to FIGS. 3 and 8b, in an exemplary embodiment, the first diffractive optic 366 comprises a holographic phase grating of a variety that is well known in the art. The second outgoing laser beam 371 is directed towards the first diffractive optic 366, diffracted by the first diffractive optic 366, and is focused by the color corrected optics embodied in the optical actuator assembly 359 to form five diffracted optical spots on the second diffractive optic 877.

Referring now to FIG. 9, in the preferred embodiment, the five diffracted optical spots include: a L(0) zeroth order spot, a horizontal LH(1) plus first order spot, a horizontal LH(−1) minus first order spot, a vertical LV(1) plus first order spot, and a vertical LV(−1) minus first order spot. In an exemplary embodiment, the LV and LH first order spots are focused onto a grating layer 880 of the second diffractive optic 877 at radial position approximately 125 um from the zeroth order spot L(0). The LH and LV plus and minus first order diffracted optical spots are reflected from the grating layer 880 and comprise the second reflected laser beam 373. In an exemplary embodiment, the first diffractive optic 366 is rotated in the optical path relative to the L(0) zeroth order spot such that the LH plus and minus first order spots are rotated and reflected at the grating layer 880 to be vertically offset relative to the L(0) zeroth order spot by an integral number plus ¼ of the pitch of the grooves 986 and 985 (i.e., 4×4.75 um+1.25 um=+/−20.25 um, respectively). The LV plus and minus first order spots are also rotated and, thus, horizontally offset +/−20.25 um relative to L(0) zeroth order spot. It will be appreciated, that the LH plus and minus first order optical spots are rotated so as to miss the 13 um cylindrical holes 882 as the optical fiber coupling assembly 364 is positioned in a direction 334 and in the optical path traversed by the second outgoing laser beam 371.

Figure 10:
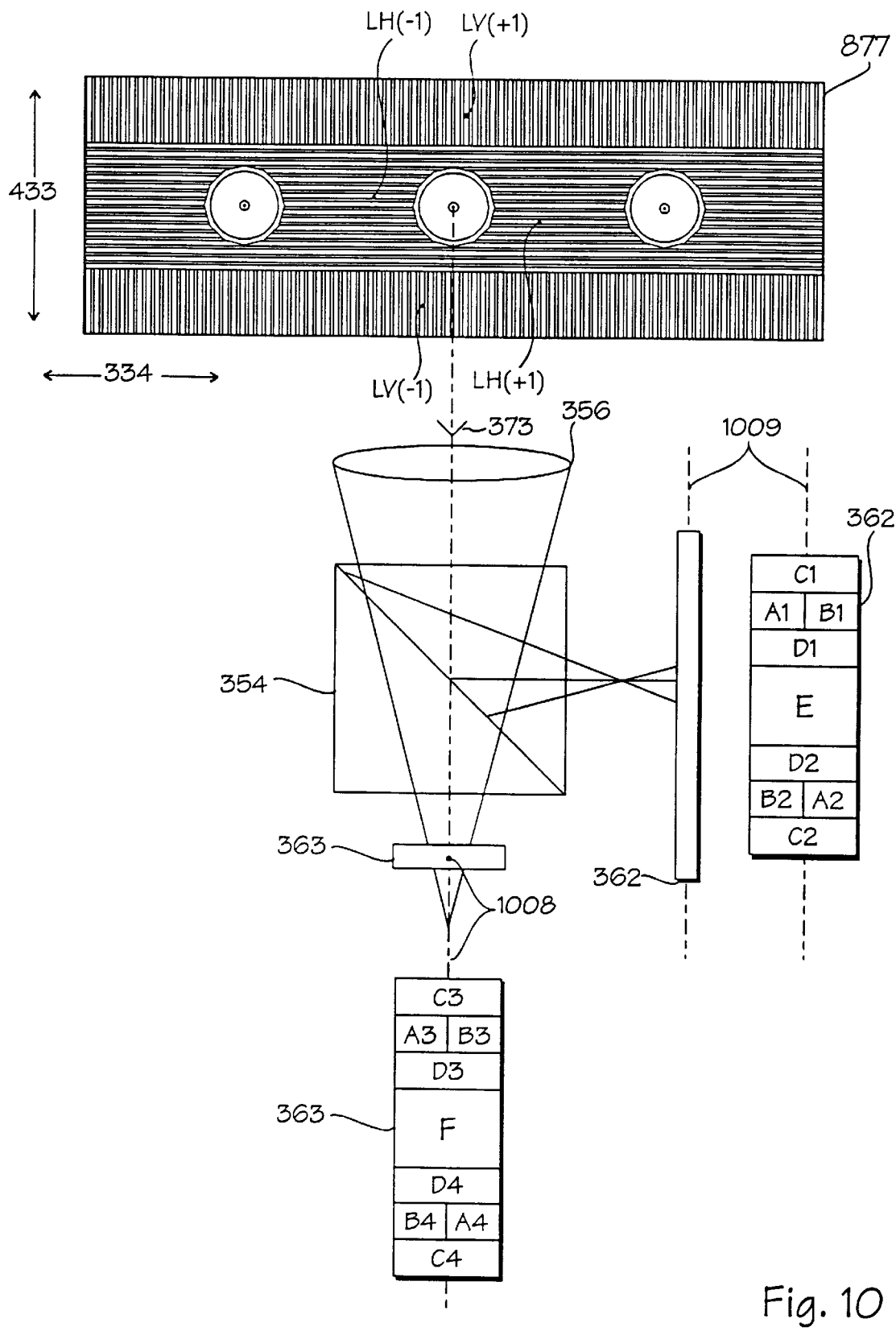
FIG. 10 is a diagram illustrating an orientation of horizontal and vertical detectors in an optical path.

FIG. 10 is a diagram illustrating an orientation of horizontal and vertical detectors in an optical path of the second reflected laser beam. The horizontal detector 363 includes a rectangular array of three sets of photo-detectors (a quad array A1–D1, A2–D2, and E), and the vertical detector 362 includes a rectangular array of three sets of photo-detectors (a quad array A3–D3, A4–D4, and F). The horizontal 363 and vertical 362 detectors are preferably positioned with respect to the second beam splitter 354 such that their respective long axes 1008 and 1009 are oriented orthogonally relative to each other. In the preferred embodiment, the second beam splitter 354 directs the LV plus first order spots towards the A3–D3 photo-detectors, the LV minus first order minus spots to the A4–D4 photo-detectors, the LH plus first order spots towards the A1–D1 photo-detectors, and the LH minus first order spots towards the A2–D2 photo-detectors. The L(0) zeroth order spot is preferably directed towards the E and F photo-detectors.

The LV plus and minus first order spots are detected by the horizontal detector 363, which generates push-pull signals A3−B3=OFFSET+sin (2×pi×X/GP)" and A4−B4= OFFSET−sIN (2×pi×X/GP)" as a function of a position X and the pitch GP of the grooves 986, respectively, and the LH plus and minus first order spots are detected by the vertical detector 362, which generates push-pull sinusodial signals A1–B1=OFFSET+sin (2×pi×Y/GP) and A2–B2=OFFSET–sin (2×pi×X/GP) as a function of a position Y and the pitch GP of the grooves 985, respectively. The OFFSET term results from either motion of the vertical 362 and horizontal 363 detectors because of thermal expansion and/or from the motion of the optical fiber coupling assembly 364 relative to the second outgoing laser beam 371. If these two signals are subtracted to get HES_N and VES_N respectively, then the OFFSET may be canceled, making for a "normally" robust tracking signal. The zero crossings of the sinusodial signals occur at the center points of the lands and grooves of the grating layer 880. The OFFSET may be obtained by adding the push-pull signals. The OFFEST may also be used during the manufacturing process for aligning the horizontal 363 and vertical 362 detectors relative to a fixed position of the optical fiber coupling assembly 364.

The LV and LH first order spots are subsequently processed using spot size measurement (SSM) techniques that are well known in the art to obtain a quadrature signal that is representative of the focus of the second outgoing laser beam 371 relative to the grooves 985 and 986. The signals that are derived from the spots include: horizontal error (HES), vertical error (VES), and focus error (FES) signals. The HES signal is used to position the optical fiber coupling assembly 364 in the horizontal direction 334 and, thus, the second outgoing laser beam 371 with respect to the vertical grooves 986. The VES signal is used to position the optical actuator assembly 359 and hence the internal color corrected optics in the vertical direction 433 and, subsequently, the second outgoing laser beam 371 with respect to the horizontal grooves 985. The FES signal is used position the optical actuator assembly 359 and hence the color corrected optics in the focus direction 350 and, thus, to focus the second outgoing laser beam 371 onto the grating layer 880.

Typically, during an initial startup condition, the optical fiber coupling assembly 364 is positioned such that the L(0) zeroth order spot is directed towards other than a central core 883 of a particular optical fiber 102. In an initial first step of use, the optical fiber coupling assembly 364 is positioned to abut against a crash stop (not shown). At this point, the second outgoing laser beam 371 preferably impinges on the grating layer 880 generally along the axis defined by the row of circular passages 881 and at a vertical edge of the second diffractive optic 877. During a next step of use, the optical fiber coupling assembly 364 is positioned in a horizontal direction 334 and along the axis defined by the row of circular passages 881 until a first amplitude change in the second reflected laser beam 373 is detected by the E and F photo-detectors. Preferably, the first detected amplitude change will be representative of the L(0) zeroth order optical spot as it passes over a first circular passage 881 (with respect to a vertical edge of the second diffractive optic 877). During a next step, the L(0) zeroth order spot is scanned vertically up and down in a direction 433 using the optical actuator assembly 359, and the optical fiber coupling assembly 364 is scanned horizontally back and forth in a direction 334 relative to the L(0) zeroth order spot. Preferably, the E and F photo-detectors will indicate a peak signal at the point the L(0) zeroth order optical spot is positioned approximately over a first cylindrical hole 882 or, equivalently, the central core 883 of a first optical fiber 102 (with respect to the vertical edge of the second diffractive optic 877).

Those skilled in the art will recognize that the first and second optical paths between the optical actuator assembly 359, and the optical fiber coupling assembly 364 are generally co-linear. Optical tolerances of the various optical components positioned in the first and second optical paths may, however, result in slight misalignment between the first and second optical paths. Thus, even though the second outgoing laser beam 371 may be aligned to the central core 883, the first outgoing laser beam 191 may be slightly misaligned from the core. More precise alignment of the first outgoing laser beam 191 to the central core 883 may be obtained using detection optics located on the flying MO head 106 (see the aforementioned U.S. patent application Ser. No. 08/851,379, entitled "Data Storage System Having An Optical Processing Flying Head") to monitor the first reflected laser beam 192 for a maximum return signal 214. A maximum return signal 214 is indicative of a central alignment of the first outgoing laser beam 191 to a core of an optical fiber 102 and is obtained using the aforementioned movements 334, 350, and 433.

Those skilled in the art will recognize, that the initial alignment of the first outgoing laser beam 191 to a central core 883 of a corresponding first optical fiber 102 will provide a reference position relative to the central core of any other of the set of optical fibers 102 since each of the set of optical fibers 102 are separated by a known number of horizontal 985 and vertical grooves 986. Thus, the first outgoing laser beam 191 may be directed onto a central core 883 of any desired optical fiber 102 by counting the number of grooves crossings sensed by the horizontal 363 and vertical 362 detectors.

Figure 11A:
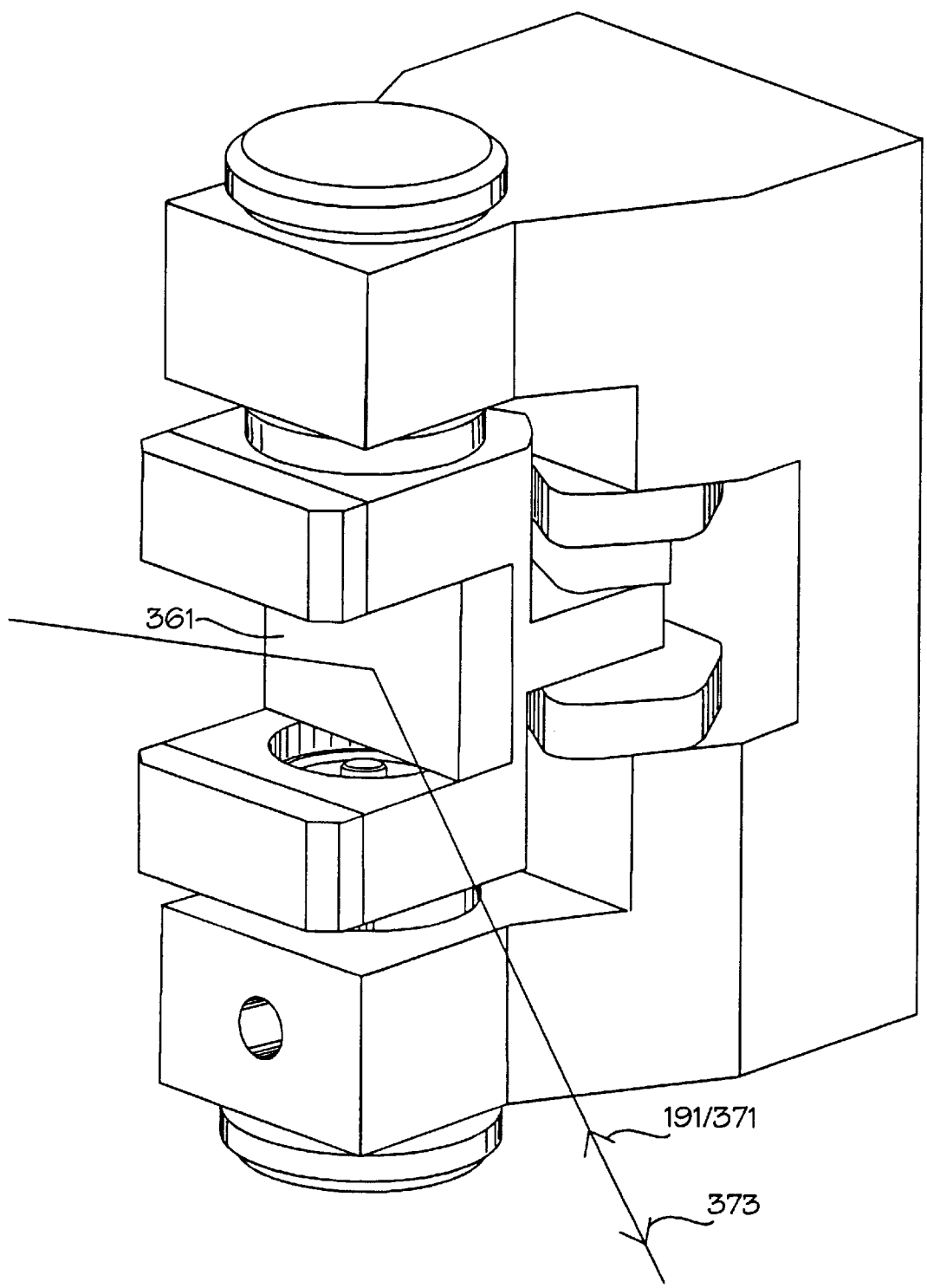
FIGS. 11a-b illustrate an embodiment of the present invention that includes a mirror and an embodiment of the present invention that does not include a mirror, respectively.
Figure 11B:
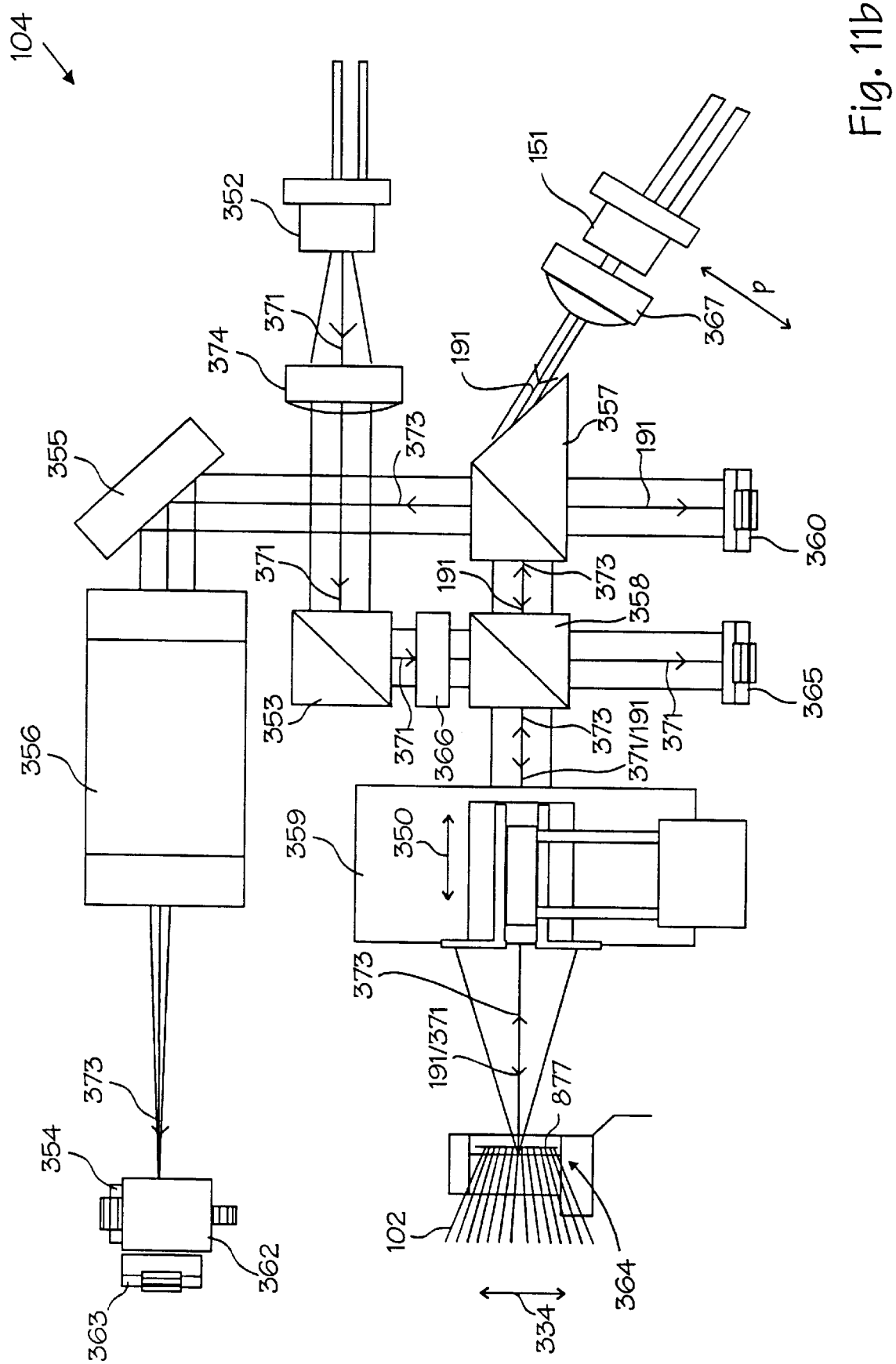

FIGS. 11 *a-b* illustrate an embodiment of the present invention that includes a mirror and an embodiment of the present invention that does not include a mirror, respectively. As discussed above the mirror 361 is used to direct the first outgoing laser beam 191, the second outgoing laser beam 371, and the third reflected laser beam 373. Those skilled in the art will recognize that in an alternative embodiment, the present invention may be used without the mirror 373, which is illustrated in FIG. 11*b*.

Figure 12:
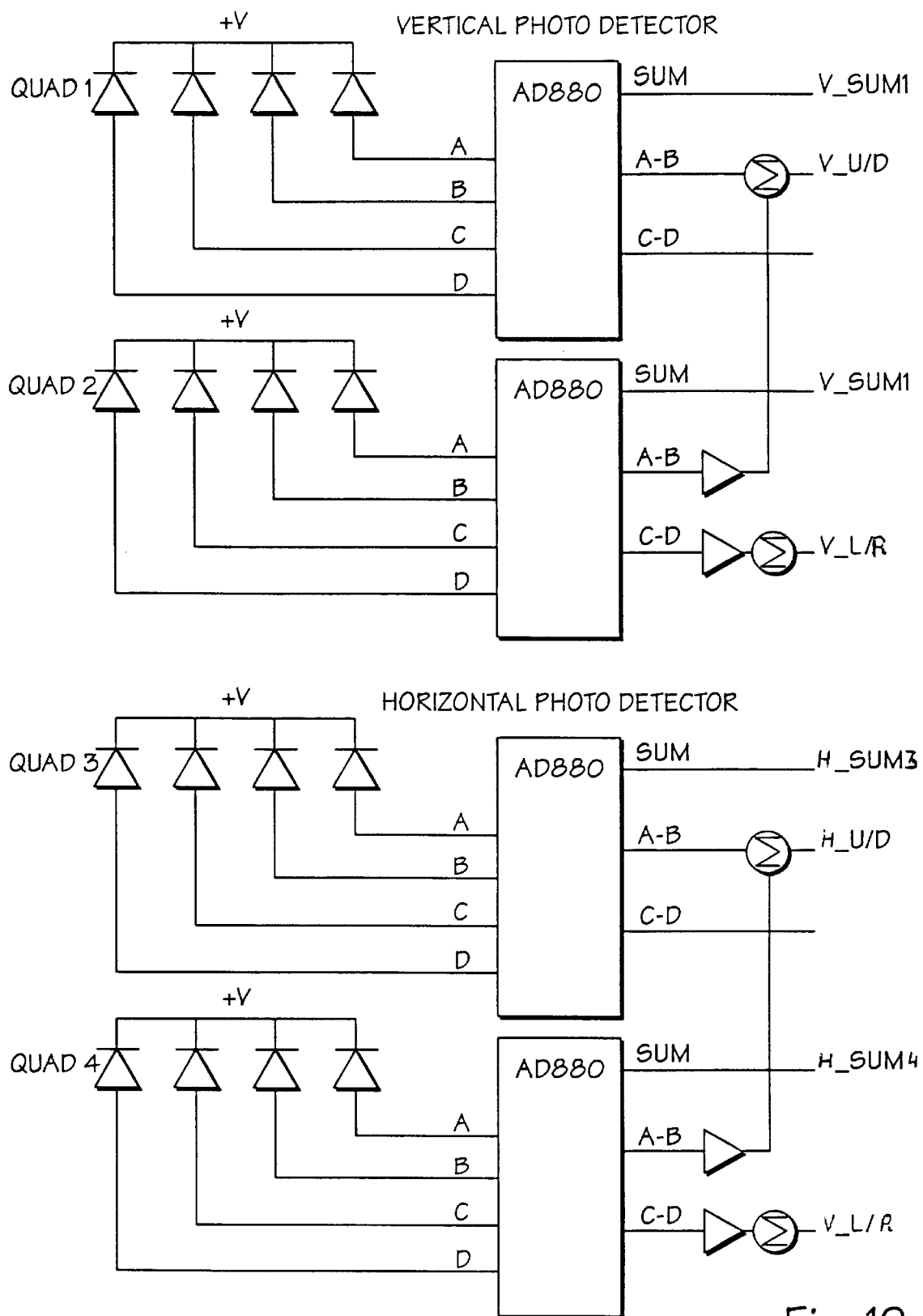
FIGS. 12 and 13 illustrate circuits for generating various SSM optical servo signals.
Figure 13:
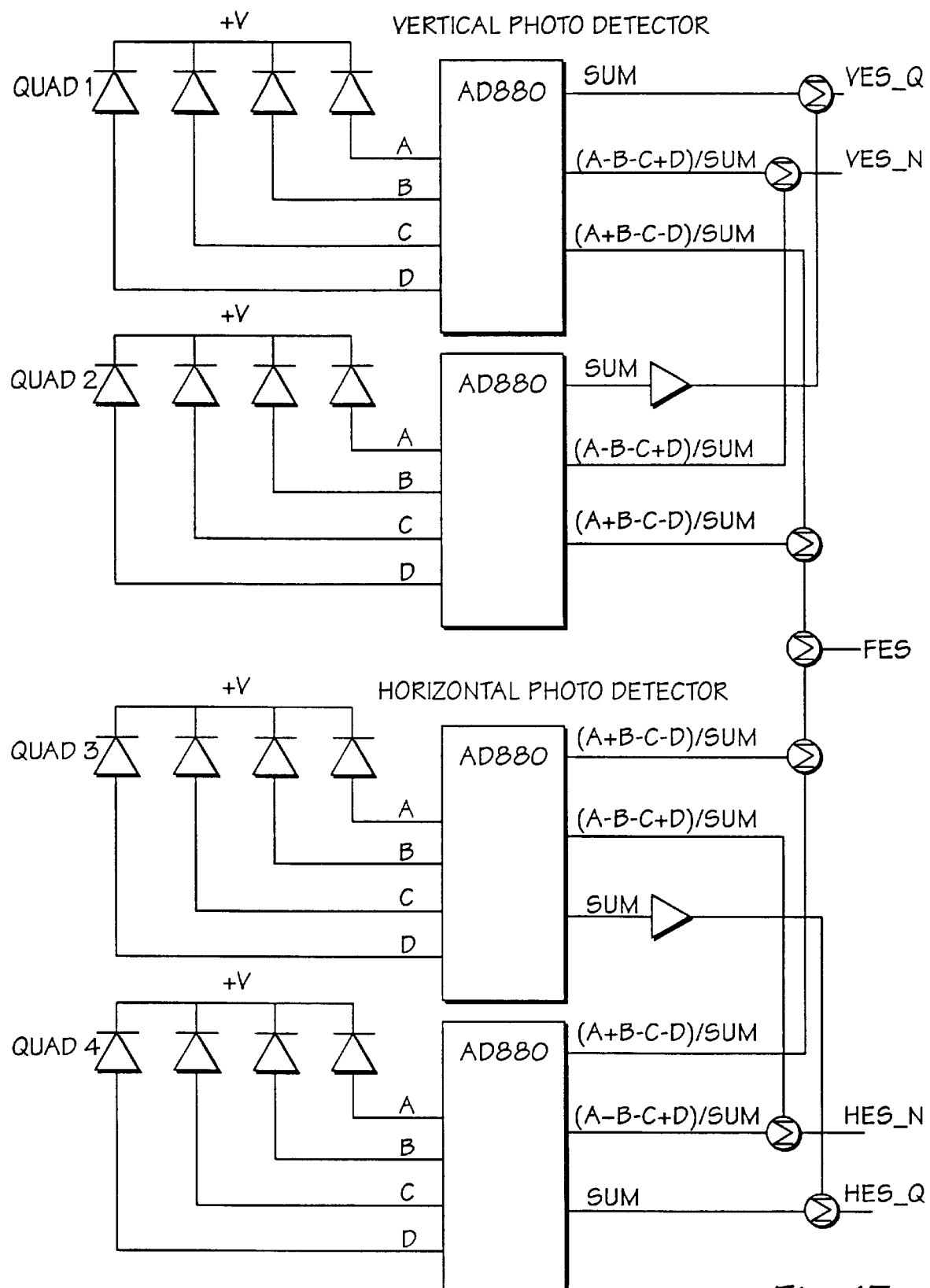

FIGS. 12 and 13 illustrate circuits for generating offset alignment, horizontal, vertical and focus optical servo signals. In an exemplary embodiment, an AD880 (manufactured by Analog Devices, Norwood, Mass.) optical servo signal generator is used to provide a set of SSM signals for control of the optical actuator assembly 359 and the optical fiber coupling assembly 364. In the exemplary embodiment, A, B, C, D inputs of four AD880 circuits (FIGS. 12 and 13) are respectively connected to the each of the A, B, C, D outputs of the vertical 362 and horizontal 363 detectors. The four AD880 circuits provide the following algebraic output signals:

MODE 1 (Alignment Mode):
  1) (A–B)
  2) (C–D)
  3) (A+B+C+D)

MODE II (Normal Operational Mode):
  1) (A+D)–(C+B)
  2) (A+B)–(C+D)
  3) (A+B+C+D)
  4) ((A+D)–(C+B))/(A+B+C+D)
  5) ((A+B)–(C+D))/(A+B+C+D)

Referring now to FIG. 12, for vertical (horizontal) photocell alignment during manufacturing, the V_SUM, V_U/D, V_LR (H_SUM, H_U/D, H_LR signals are calculated as follows (where U/D means up/down and LR means left/right:

V_SUM1=(A1+B1+C1+D1)
V_SUM2=(A2+B2+C2+D2)
V_U/D=(A1-B1)-(A2-B2)
V_L/R=(C1-D1)+(C2-D2)
H_SUM3=(A3+B3+C3+D3)
H_SUM4=(A4+B4+C4+D4)
H_U/D=(A3-B3)-(A4-B4)
H_L/R=(C3-D3)+(C4-D4)

Referring now to FIG. 13, the vertical VES and horizontal HES normal and focus FES error signals are calculated as follows:

VES_N=((A1+D1)-(C1+B1))/(A1+B1+C1+D1)+((A2+D2)-(C2+B2))/(A2+B2+C2+D2)

VES_Q=(A1+B1+C1+D1)-(A2+B2+C2+D2)

HES_N=((A3+D3)-(C3+B3))/(A3+B3+C3+D3)+((A4+D4)-(C4+B4))/(A4+B4+C4+D4)

HES_Q=(A3+B3+C3+D3)-(A4+B4+C4+D4)

The SSM focus error signal FES are calculated as follows:

$$FES = (((A1 + B1) - (C1 + D1))/(A1 + B1 + C1 + D1) +$$
$$((A2 + B2) - (C2 + D2))/(A2 + B2 + C2 + D2)) -$$
$$(((A3 + B3) - (C3 + D3))/(A3 + B3 + C3 + D3) +$$
$$((A4 + B4) - (C4 + D4))/(A4 + B4 + C4 + D4))$$

Figure 14:
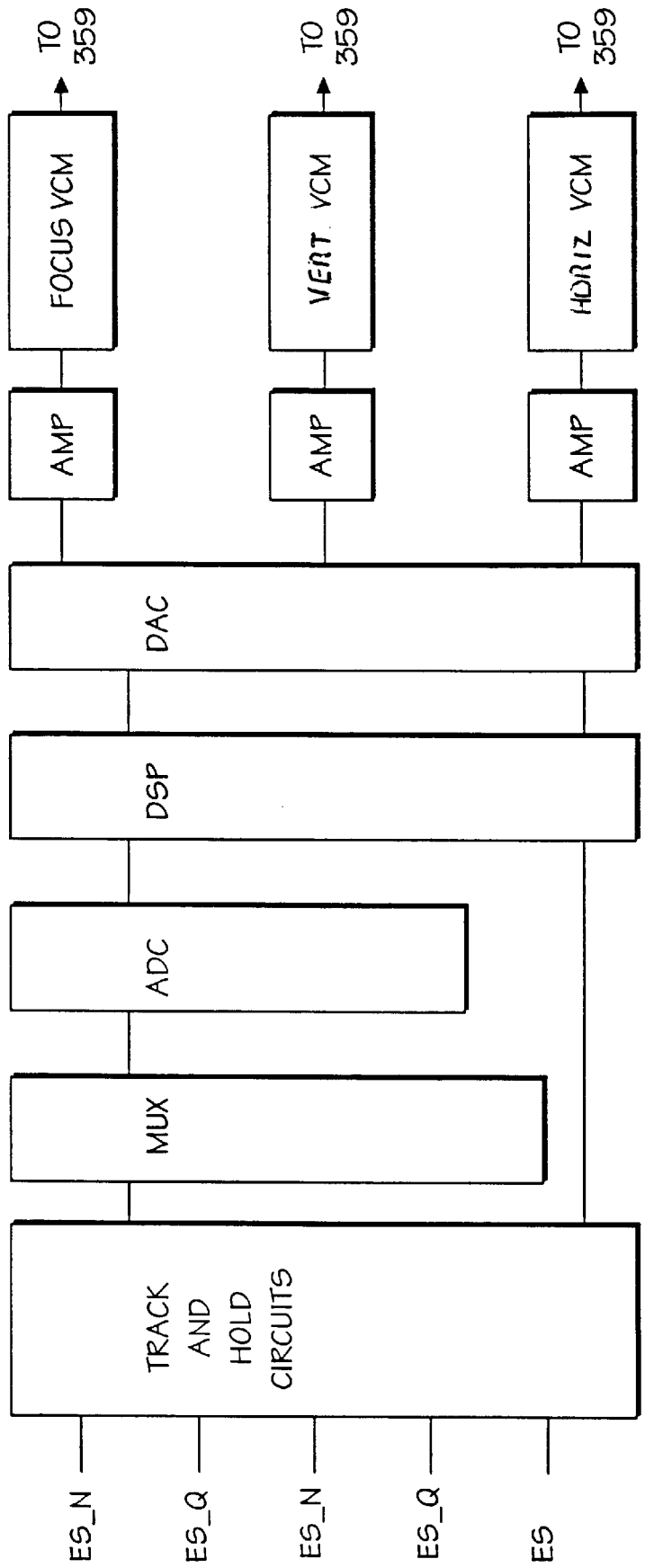
FIG. 14 illustrates a circuit that uses the SSM signals.

FIG. 14 illustrates a circuit that uses position error signals for control of the optical actuator assembly and the scanning mirror. In an exemplary circuit illustrated in FIG. 14, the VES, HES, and FES signals are processed by a control system that comprises a digital signal processor (DSP). The control system generates appropriate control signals for positioning the optical actuator assembly 359 and optical fiber coupling assembly 364.

Figure 15:
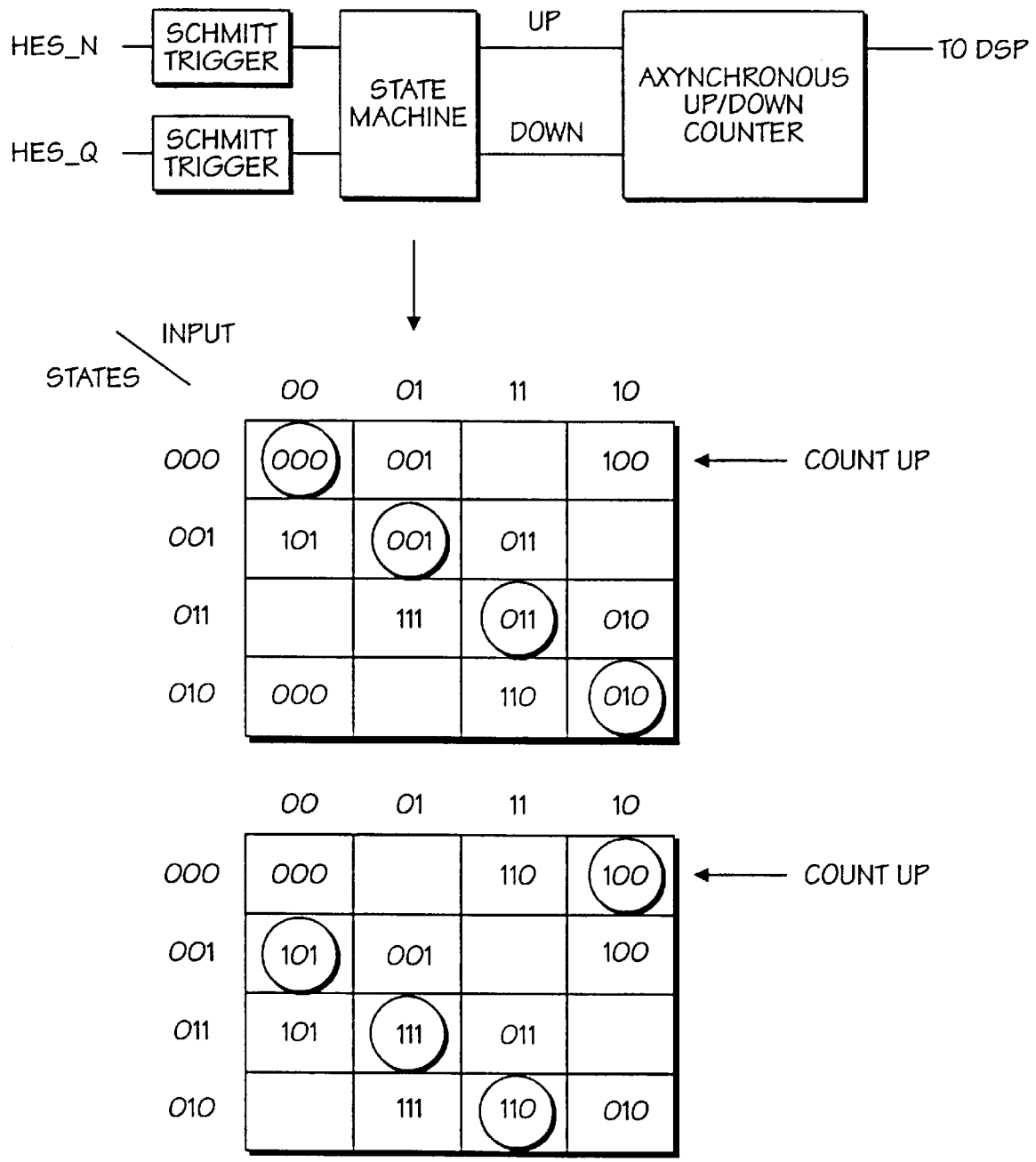
FIG. 15 illustrates a circuit and state diagram for counting horizontal grooves.

FIG. 15 illustrates a circuit and state diagram for counting horizontal grooves. One consideration for using the control method includes determination of a preferable sampling rate. The focus and vertical control systems may have a relatively low sampling rate (20 KHz) because all they have to do is to hold FES and VES/HES position to about 1 and 0.1 um 3-sigma respectively. In an exemplary embodiment, the horizontal control system includes several additional requirements:

1) Seeking at a maximum velocity of 0.5 m/sec. If a spot acceleration of 100 g's can be achieved with the optical fiber coupling assembly 364, it would take 1 ms to move the 250 um between adjacent optical fibers 102. The maximum velocity would be 0.5 m/sec, giving a groove crossing rate of 125,000 crossing per second with a 4 um grating. It would take 0.5 ms to cross each additional optical fiber 102 at 0.5 m/sec (for a worst case outgoing laser beam 191 switching time between optical fibers 102 and, therefore, MO heads 107 of 6 ms.)

2) Using a sampling frequency of 200 KHz if the grating pitch is approximately 5 um. A lower sampling rate (20 KHz) can be used if a track counter is implemented in hardware. FIG. 15 illustrates a circuit and state diagram for a track counter state diagram.

3) Keeping accurate track of position for verification that the outgoing laser beam 191 is being directed to the correct flying MO head 106. This means that the HES_N and HES_Q signals would have to be sampled at a high enough rate that even for a shock during seeking that the grating count will not be lost. This requirement may be implemented with the track crossing counter illustrated in FIG. 15.

FIG. 16 illustrates series of process steps for manufacturing the second diffractive optic.

While the present invention is described as being used in an MO data storage and retrieval system 100, the laser-optics assembly 104 described herein may be used in many different environments and many different embodiments, for example, with other optical sources of light, with other types of optical fibers, and/or with other types of optical elements. The present invention is also applicable to information transfer using other head technologies, for example, optical heads in compact disks (CD) and digital video disks (DVD), and optical switching for example with optical communications technologies.

Thus, It is understood that the present invention can find utility in a variety of environments. Therefore, although the present invention has been described herein with reference to particular embodiments thereof, a latitude of modification, various changes and substitutions are intended in the foregoing disclosure, and it will be appreciated that in some instances some features of the invention will be employed without a corresponding use of other features without departure from the scope of the invention as set forth.

What is claimed is:

1. An optical switch, comprising:
   a first source comprising a first beam of light;
   a second source comprising a second light beam of light;
   a first diffractive optic;
   a second diffractive optic, wherein said second diffractive optic is positioned in an optical path of a second beam of light, wherein said second diffractive optics diffracts said second beam of light;
   a directing assembly; said directing assembly changing an orientation of an optical path of said first beam of light and an orientation of said optical path of said second beam of light relative to said first diffractive optic;
   a detection element for detecting a reflection of said second beam of light from said first diffractive optic as a third beam of light and for providing a detection signal from said third beam of light; and
   at least one output port, wherein said directing assembly responsively directs said first beam of light towards an output port based on said detection signal.

2. The apparatus as recited in claim 1, wherein said first diffractive optic comprises a first set of grooves and a second set of grooves, wherein said first set of grooves and said second set of grooves are orthogonal to each other.

3. A system, comprising:
   a first source comprising a first beam of light;
   a second source comprising a second beam of light;
   a diffractive optic, wherein said diffractive optic diffracts said second beam of light as a third beam of light, wherein said diffractive optic comprises an output port;
   a directing assembly; said directing assembly changing an orientation of an optical path of said first beam of light relative to said diffractive optic;
   a detection element for detecting said third beam of light and for providing a detection signal;
   at least one destination, wherein based on said detection signal said directing assembly responsively directs said first beam of light towards said destination; and
   a data storage location responsive to said first beam of light, wherein said destination comprises said output port, wherein said first beam of light is directed through said output port towards said data storage location.

4. The system as recited in claim 3, further comprising an optical fiber, wherein a first end of said optical fiber is coupled to said output port.

5. The system as recited in claim 4, wherein a second end of said optical fiber is coupled to an optical head.

6. The system as recited in claim 5, wherein said optical head is a flying optical head.

7. A system, comprising:

a first source comprising a first beam of light;

a second source comprising a second beam of light;

a diffractive optic, wherein said diffractive optic diffracts said second beam of light as a third beam of light, wherein said diffractive optic comprises a first set of grooves and a second set of grooves, wherein said first set of grooves and said second set of grooves are orthogonal to each other;

a directing assembly; said directing assembly changing an orientation of an optical path of said first beam of light relative to said diffractive optic;

a detection element for detecting said third beam of light and for providing a detection signal; and at least one destination, wherein based on said detection signal said directing assembly responsively directs said first beam of light towards said destination.

8. A system, comprising:

a first source comprising a first beam of light;

a second source comprising a second beam of light;

a diffractive optic, wherein said diffractive optic diffracts said second beam of light as a third beam of light;

a directing assembly; said directing assembly changing an orientation of an optical path of said first beam of light relative to said diffractive optic;

a detection element for detecting said third beam of light and for providing a detection signal;

at least one destination, wherein based on said detection signal said directing assembly responsively directs said first beam of light towards said destination; and wherein said first beam of light and said second beam of light traverse a substantially co-linear optical path.

9. An apparatus for selectively directing a first beam of light, comprising:

a first diffractive optic;

a second diffractive optic, wherein said second diffractive optic is positioned in an optical path of a second beam of light, wherein said second diffractive optics diffracts said second beam of light into a plurality of substantially co-linear optical paths;

a directing assembly, said directing assembly changing an orientation of an optical path of said first beam of light and an orientation of an optical path of said second beam of light relative to said second diffractive optic; and a detection element for detecting a reflection of said second beam from said first diffractive optic as a third beam of light and for providing a detection signal therefrom; wherein based on said detection signal said directing assembly controllably changes said orientation of said optical path of said first beam of light.

10. The apparatus as recited in claim 9, wherein said first diffractive optic comprises an output port.

11. The apparatus as recited in claim 9, wherein said second diffractive optic comprises a holographic diffractive optic.

12. The apparatus as recited in claim 9, wherein said first diffractive optic comprises a first set of grooves and a second set of grooves, wherein said first set of grooves and said second set of grooves are disposed with different angular orientations relative to each other.

13. The apparatus as recited in claim 9, wherein said first beam of light and said second beam of light traverse a substantially co-linear optical path.

14. The apparatus as recited in claim 9, wherein said first diffractive optic comprises a first set of grooves and a second set of grooves, wherein said first set of grooves and said second set of grooves are orthogonal to each other.

15. The apparatus as recited in claim 14, wherein said third beam of light comprises a plurality of optical spots, and wherein detection element detects an orientation of said plurality of optical spots relative to said grooves.

16. A method of directing light between a source and a destination comprising the steps of:

providing a first diffractive optic;

providing a first beam of light;

providing a second beam of light;

diffracting said second beam of light with a second diffractive optic into a plurality of substantially co-linear optical beams;

directing said second beam of light substantially co-linear with said first beam of light;

directing said first beam of light and said second beam of light towards said first diffractive optic;

directing a reflection of said second beam of light from said first diffractive optic towards a detection element;

detecting a change in the position of said plurality of optical beam relative to said second diffractive optic with said detection element controllably directing said first beam of light based on said detected change in position of said plurality of optical beam.

17. The method as recited in claim 16, wherein said step of directing said first beam of light comprises directing said first beam of light towards a particular output port selected from a plurality of output ports.

18. The method as recited in claim 17, wherein said step of controllably directing said first beam of light further comprises directing said first beam of light towards a storage disk of a disk drive.

* * * * *